(12) United States Patent
Khoury

(10) Patent No.: US 11,540,199 B2
(45) Date of Patent: Dec. 27, 2022

(54) DISCOVERY OF A NETWORK TOPOLOGY FROM A CLIENT PERSPECTIVE

(71) Applicant: ARRIS Enterprises LLC, Suwanee, GA (US)

(72) Inventor: Peter G. Khoury, San Francisco, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/353,919

(22) Filed: Jun. 22, 2021

(65) Prior Publication Data

US 2021/0410043 A1 Dec. 30, 2021

Related U.S. Application Data

(60) Provisional application No. 63/046,475, filed on Jun. 30, 2020.

(51) Int. Cl.
| | |
|---|---|
| *H04W 40/24* | (2009.01) |
| *H04B 17/318* | (2015.01) |
| *H04W 4/33* | (2018.01) |
| *H04W 16/20* | (2009.01) |
| *H04W 84/12* | (2009.01) |

(Continued)

(52) U.S. Cl.
CPC ........ *H04W 40/246* (2013.01); *H04B 17/318* (2015.01); *H04W 4/33* (2018.02); *H04W 16/20* (2013.01); *H04W 84/12* (2013.01); *H04W 88/08* (2013.01)

(58) Field of Classification Search
CPC ..... H04W 40/24; H04W 40/246; H04W 4/30; H04W 4/33; H04W 16/19; H04W 16/20; H04W 84/12; H04W 88/08; H04W 88/085; H04W 88/10; H04B 17/30; H04B 17/309; H04B 17/318
See application file for complete search history.

(56) References Cited

U.S. PATENT DOCUMENTS

| | | | | |
|---|---|---|---|---|
| 10,225,775 | B2 * | 3/2019 | Townend | ........ H04W 36/00837 |
| 10,624,022 | B2 * | 4/2020 | Lee | ........................ H04W 48/16 |

(Continued)

*Primary Examiner* — Jenee Holland
(74) *Attorney, Agent, or Firm* — Steven Stupp; Stewart Wiener

(57) ABSTRACT

An access point that determines communication boundaries is described. During operation, the access point may receive one or more probe requests associated with the one or more electronic devices, where a given probe request may include an identifier of a given electronic device. Moreover, when the access point receives the given probe request, the access point may determine a signal strength associated with the given probe request and timestamps when the given probe request was received. Then, the access point may exchange probe-request information with one or more additional access points, where the probe-request information corresponds to received probe requests. Next, the access point may compare the probe-request information to determine the communication boundaries. For example, the communication boundaries may be determined by comparing the probe-request information for pairs of access points. Furthermore, the access point may identify neighboring access points based at least in part on the probe-request information.

20 Claims, 7 Drawing Sheets

(51) Int. Cl.
*H04W 88/08* (2009.01)
*H04W 16/18* (2009.01)

(56) References Cited

U.S. PATENT DOCUMENTS

| | | | | |
|---|---|---|---|---|
| 10,687,338 | B1* | 6/2020 | Henry | H04L 5/0053 |
| 2006/0171388 | A1* | 8/2006 | Ikeda | H04W 8/005 |
| | | | | 370/389 |
| 2007/0189249 | A1* | 8/2007 | Gurevich | H04L 45/26 |
| | | | | 370/338 |
| 2008/0080388 | A1* | 4/2008 | Dean | H04L 43/16 |
| | | | | 370/252 |
| 2008/0225809 | A1* | 9/2008 | Guo | H04W 40/246 |
| | | | | 370/338 |
| 2009/0054096 | A1* | 2/2009 | Single | H04W 52/325 |
| | | | | 455/509 |
| 2013/0294354 | A1* | 11/2013 | Zhang | H05K 999/99 |
| | | | | 370/329 |
| 2013/0322418 | A1* | 12/2013 | Ho | H04W 48/20 |
| | | | | 370/338 |
| 2015/0031404 | A1* | 1/2015 | Yada | H04W 76/25 |
| | | | | 455/508 |
| 2015/0098358 | A1* | 4/2015 | Park | H04W 48/10 |
| | | | | 370/254 |
| 2015/0359023 | A1* | 12/2015 | Stojanovski | H04W 72/0446 |
| | | | | 370/329 |
| 2016/0007278 | A1* | 1/2016 | Gupta | H04W 76/10 |
| | | | | 370/329 |
| 2016/0044596 | A1* | 2/2016 | Iwai | H04L 5/0048 |
| | | | | 370/311 |
| 2016/0095071 | A1* | 3/2016 | Henry | H04W 52/283 |
| | | | | 370/338 |
| 2016/0112935 | A1* | 4/2016 | Ahuja | H04W 48/16 |
| | | | | 370/338 |
| 2016/0183181 | A1* | 6/2016 | Lee | H04W 48/20 |
| | | | | 370/338 |
| 2016/0270129 | A1* | 9/2016 | Wang | H04W 48/14 |
| 2017/0257821 | A1* | 9/2017 | Smith | H04L 41/0853 |
| 2017/0272951 | A1* | 9/2017 | Howard | H04W 48/14 |
| 2017/0366249 | A1* | 12/2017 | Van Oost | H04W 52/0206 |
| 2018/0270608 | A1* | 9/2018 | Thoresen | H04W 12/06 |
| 2019/0069340 | A1* | 2/2019 | Wang | H04W 12/06 |
| 2019/0090183 | A1* | 3/2019 | Moriya | H04B 17/318 |
| 2019/0090291 | A1* | 3/2019 | Jain | H04W 92/10 |
| 2019/0166636 | A1* | 5/2019 | Sahu | H04W 88/10 |
| 2019/0222995 | A1* | 7/2019 | Abouelseoud | H04W 8/005 |
| 2019/0289488 | A1* | 9/2019 | Jain | H04W 24/02 |
| 2019/0289539 | A1* | 9/2019 | Lee | H04W 48/16 |
| 2019/0320385 | A1* | 10/2019 | Bhartia | H04W 28/0831 |
| 2020/0186233 | A1* | 6/2020 | Park | H01Q 13/203 |

* cited by examiner

DISCOVERY OF A NETWORK TOPOLOGY FROM A CLIENT PERSPECTIVE

CROSS REFERENCE TO RELATED APPLICATIONS

This application claims priority under 35 U.S.C. 119(e) to: U.S. Provisional Application Ser. No. 63/046,475, "Discovery of a Network Topology from a Client Perspective," filed on Jun. 30, 2020, by Peter G. Khoury, the contents of which are herein incorporated by reference.

FIELD

The described embodiments relate to techniques for an access point to determine a network topology from the perspective of an electronic device that is associated with the access point.

BACKGROUND

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In a wireless local area network (WLAN) that is compatible with an IEEE 802.11 standard, management of the WLAN may be facilitated by determining communication boundaries (which are sometimes included in and/or referred to as a 'network topology') in the communication coverage provided by access points in the WLAN. FIG. 1 presents an illustration of a top view of environment 100 with a WLAN and communication boundaries 112 between access points 110.

Communication boundaries 112 are typically determined from a perspective of access points 110. As shown in FIG. 2, which presents a side view of environment 100, electronic devices 114 in the WLAN (such as electronic devices 114 that are associated with access points 110, which are sometimes referred to as 'client') often have a different perspective.

Notably, access points 110 may be mounted or deployed above a hanging ceiling 210 in a building, while electronic devices 114 may be used by users in an office below. When the network topology is determined from the perspective of access points 110 (such as based on communication among access points 110), communication boundaries 112 may not be accurate from the perspective of the users of electronic devices 114. For example, using access point-to-access point communication, a communication boundary 112-1 may be determined to be midway between access points 110-1 and 110-2. However, walls (such as wall 212) and other obstacles may adversely affect the signal strength from access points 110 at electronic devices 114. Consequently, communication boundaries 112 may not accurately reflect the effective communication boundary in the office, and management of the WLAN based on communication boundaries 112 may result in suboptimal communication performance.

SUMMARY

In a first group of embodiments, an access point that determines communication boundaries in a WLAN is described. This access point includes an interface circuit that wirelessly communicates with one or more electronic devices, and that communicates (using wirelessly or wired communication) with one or more additional access points. During operation, the access point may receive one or more probe requests associated with the one or more electronic devices. Note that a given probe request may include an identifier of a given electronic device. Moreover, when the access point receives the given probe request, the access point may determine a signal strength associated with the given probe request and a timestamp when the given probe request was received. Then, the access point may provide, to the one or more additional access points, probe-request information for the one or more probe requests, where the probe-request information from the access point includes identifiers, signal strengths and timestamps of the one or more probe requests received by the access point. Furthermore, the access point may receive, from the one or more additional access points, additional probe-request information for at least the one or more probe requests, where the additional probe-request information from the one or more additional access points includes additional identifiers, additional signal strengths and additional timestamps for the one or more probe requests received by the one or more additional access points. Next, the access point may compare the probe-request information and the additional probe-request information to determine the communication boundaries.

Note that the identifier may include a media access control or MAC address.

Moreover, the signal strength may include a received signal strength (RSSI).

Furthermore, the one or more probe requests may include wild-card probe requests.

Additionally, the access point may compare the probe-request information and the additional probe-request information for pairs of access points to determine the communication boundaries.

In some embodiments, the access point may provide, to the one or more additional access points, the determined communication boundaries, and may receive, from the one or more additional access points, additional communication boundaries determined by the one or more additional access points. Then, the access point may compute common communication boundaries in the WLAN based at least in part on the communication boundaries and the additional communication boundaries. Next, the access point may provide, to the one or more additional access points, the common communication boundaries.

Moreover, the access point may provide, to an electronic device in the one or more electronic devices, a recommendation for a transition in the WLAN based at least in part on the determined communication boundaries and a signal strength associated with the electronic device. For example, the recommendation may include a transition to a different channel or a different access point. In some embodiments, the recommendation is compatible with basic service set (BSS) transition management.

Furthermore, the access point may identify neighboring access points based at least in part on the probe-request information and the additional probe-request information.

Another embodiment provides a computer that performs at least some of the operations performed by the access point. For example, the computer may be a cloud-based computer that determines the communication boundaries (and, more generally, a network topology) on behalf of the access point and the one or more additional access points.

Another embodiment provides a computer-readable storage medium for use with the access point. This computer-readable storage medium may include program instructions that, when executed by the access point, cause the access point to perform at least some of the aforementioned operations.

Another embodiment provides a method. This method includes at least some of the operations performed by the access point.

In a second group of embodiments, a controller (such as a cloud-based controller) determines communication boundaries in a WLAN by performing at least some of the operations of the access point in the first group of embodiments.

Another embodiment provides a computer-readable storage medium for use with the controller. This computer-readable storage medium may include program instructions that, when executed by the controller, cause the controller to perform at least some of the aforementioned operations.

Another embodiment provides a method. This method includes at least some of the operations performed by the controller.

In a third group of embodiments, a computer is described. This computer includes an interface circuit that communicates with one or more access points. During operation, the computer receives probe-request information associated with the one or more access points, where the probe-request information includes identifiers of electronic devices, timestamp information associated with probe requests, and signal-strength information of the probe requests. Then, the computer compares the probe-request information from different access points to determine communication boundaries between regions in which communication performance is superior for different access points.

Another embodiment provides a computer-readable storage medium for use with the computer. This computer-readable storage medium may include program instructions that, when executed by the computer, cause the computer to perform at least some of the aforementioned operations.

Another embodiment provides a method. This method includes at least some of the operations performed by the computer.

In a third group of embodiments, an access point is described. This access point includes: an antenna; and an interface circuit, coupled to the antenna, that wirelessly communicates with electronic devices and wired or wirelessly communicates with at least one of a group of additional access points. During operation, the access point selectively responds to a probe request that is received from a first of the electronic devices based at least in part on a communication boundary between the access point and one of the group of additional access points that is determined based at least in part on a comparison of signal-strength information of respective probe requests received from the first of the electronic devices at the access point and at least one of the group of additional access points.

Note that the probe requests may have been received at the access point and the at least one of the group of additional access points within a predetermined timeframe. Moreover, the probe requests may include an identifier of the first of the electronic devices.

Another embodiment provides a computer-readable storage medium for use with the access point. This computer-readable storage medium may include program instructions that, when executed by the access point, cause the access point to perform at least some of the aforementioned operations.

Another embodiment provides a method. This method includes at least some of the operations performed by the access point.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that determines communication boundaries in a WLAN is described. During operation, the access point may receive one or more probe requests associated with the one or more electronic devices, where a given probe request may include an identifier of a given electronic device. Moreover, when the access point receives the given probe request, the access point may determine a signal strength associated with the given probe request and a timestamp when the given probe request was received. Then, the access point may exchange probe-request information with one or more additional access points, where the probe-request information corresponds to received probe requests. Next, the access point may compare the probe-request information to determine the communication boundaries. For example, the communication boundaries may be determined by comparing the probe-request information for pairs of access points. Furthermore, the access point may identify neighboring access points based at least in part on the probe-request information.

By determining the communication boundaries (and, more generally, the network topology) from the client perspective, these communication techniques may facilitate improved management of a WLAN. For example, the access point may make more-accurate recommendations, such as a recommendation for a transition (e.g., to a different channel or a different access point). Therefore, a recipient of such a recommendation (e.g., one of the electronic devices) may be more likely to accept the recommendation. Similarly, the access point may use the communication boundaries to determine when to selectively respond to a probe request from one of the electronic devices. Consequently, the communication techniques may improve the communication performance in the WLAN, which may reduce user frustration when using the electronic devices and the associated WLAN and, thus, may provide an improved user experience.

In the discussion that follows, access points, electronic devices and/or components in a system communicate packets or frames in accordance with a wireless communication protocol, such as: a wireless communication protocol that is compatible with an IEEE 802.11 standard (which is sometimes referred to as 'Wi-Fi®,' from the Wi-Fi Alliance of Austin, Tex.), Bluetooth, and/or another type of wireless interface (such as another wireless-local-area-network interface). Moreover, an access point in the system may communicate with other access points and/or a controller or services using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

Figure 3:
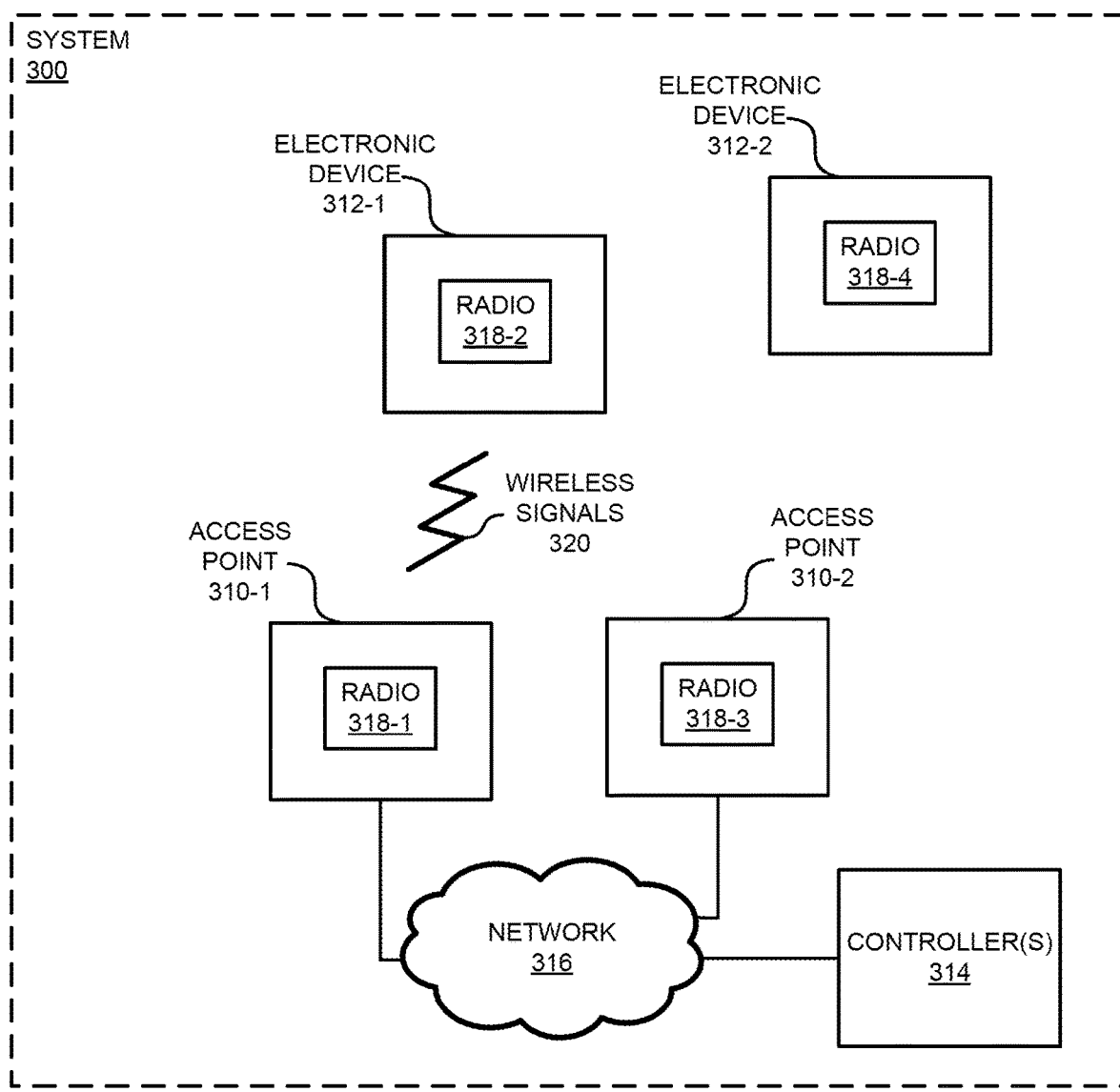
FIG. 3 is a block diagram illustrating an example of a system in accordance with an embodiment of the present disclosure.

We now describe some embodiments of the communication techniques. FIG. 3 presents a block diagram illustrating an example of a system 300, which may include components, such as: one or more access points 310, one or more electronic devices 312 (such as cellular telephones, stations or clients, another type of electronic device, etc.), and one or more optional controllers 314. In system 300, one or more of the one or more access points 310 may wirelessly communicate with one or more of the one or more electronic devices 312 using wireless communication that is compatible with an IEEE 802.11 standard. Thus, the wireless communication may occur in, e.g., a 2.4 GHz, a 5 GHz and/or a 60 GHz frequency band. (Note that IEEE 802.11ad communication over a 60 GHz frequency band is sometimes referred to as 'WiGig.' In the present discussion, these embodiments are also encompassed by 'Wi-Fi.') However, a wide variety of frequency bands may be used. Moreover, the one or more access points 310 may communicate with each other and/or with the one or more optional controllers 314 via network 316 (such as the Internet, an intra-net and/or one or more dedicated links). Note that the one or more optional controllers 314 may be at the same location as the other components in system 300 or may be located remotely (i.e., at a different location). Moreover, note that the one or more access points 310 may be managed and/or configured by the one or more optional controllers 314. Furthermore, note that the one or more access points 310 may provide access to network 316 (e.g., via an Ethernet protocol), and may be a physical access point or a virtual or 'software' access point that is implemented on a computer or an electronic device. While not shown in FIG. 3, there may be additional components or electronic devices, such as a router.

Additionally, as noted previously, the one or more access points 310 and the one or more electronic devices 312 may communicate via wireless communication. Notably, one or more of access points 310 and one or more of electronic devices 312 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 7:
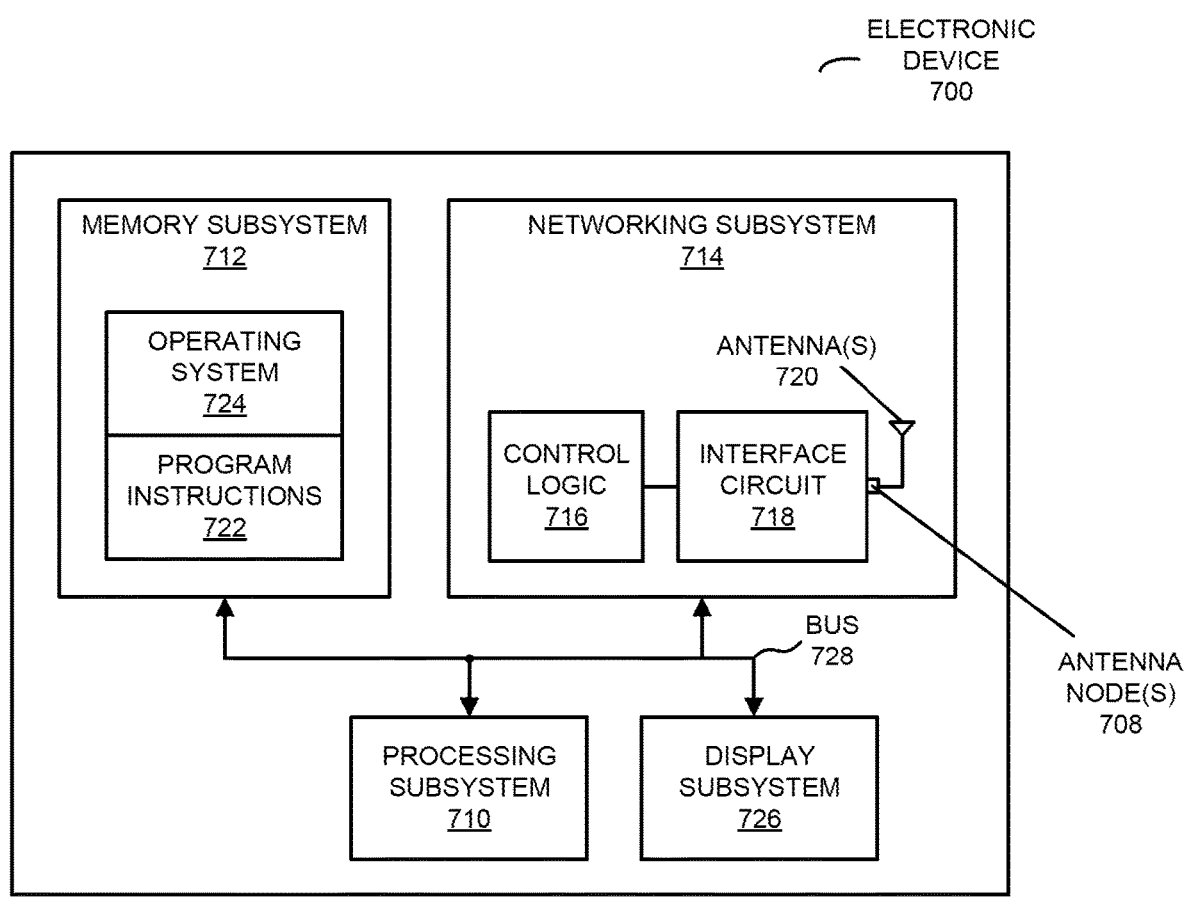
FIG. 7 is a block diagram illustrating an example of an electronic device in accordance with an embodiment of the present disclosure.

As described further below with reference to FIG. 7, the one or more access points 310, the one or more electronic devices 312 and/or the one or more optional controllers 314 may include subsystems, such as a networking subsystem, a memory subsystem and a processor subsystem. In addition, the one or more access points 310 and the one or more electronic devices 312 may include radios 318 in the networking subsystems. More generally, the one or more access points 310 and the one or more electronic devices 312 can include (or can be included within) any electronic devices with the networking subsystems that enable the one or more access points 310 and the one or more electronic devices 312 to wirelessly communicate with each other.

As can be seen in FIG. 3, wireless signals 320 (represented by a jagged line) are transmitted from a radio 318-2 in electronic device 312-1. These wireless signals are received by radio 318-1 in at least one of the one or more access points 310, such as access point 310-1. Notably, electronic device 312-1 may transmit frames or packets. In turn, these frames or packets may be received by access point 310-1. This may allow electronic device 312-1 to communicate information to access point 310-1. Note that the communication between electronic device 312-1 and access point 310-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 318 are shown in the one or more electronic devices 312 and the one or more access points 310, one or more of these instances may be different from the other instances of radios 318.

As noted previously, access points 310 and/or one or more optional controllers 314 may determine a network topology in a WLAN, such as communication boundaries between access points 310, nearest neighbor or adjacent access points, second nearest neighbor access points, etc. However, the network topology from the perspective of access points 310 may be different than the network topology from the perspective of electronic devices 312. These differences can make it more difficult to correctly manage the WLAN.

In order to address this problem, access points 310 and/or one or more optional controllers 314 may determine a network topology in a WLAN from the perspective of electronic devices 312. Notably, as described further below with reference to FIGS. 2-6, one or more of access point 310 may receive one or more probe requests from one or more of electronic devices 312. A given probe request may include an identifier of a given electronic device (such as electronic device 312-1). Moreover, when a given access point (such as access point 310-1) receives the given probe request, access point 310-1 may determine a signal strength associated with the given probe request and a timestamp when the given probe request was received. Then, access point 310-1 may exchange probe-request information with the remaining access points 310, where the probe-request information corresponds to probe requests received by access points 310. Next, access point 310-1 may compare the probe-request information to determine the communication boundaries. For example, the communication boundaries may be determined by comparing the probe-request information for pairs of access points 310 (such as access points 310-1 and 310-2). Furthermore, access point 310-1 may identify neighboring access points 310 based at least in part on the probe-request information.

In these ways, access points 310 and one or more optional controllers 314 may determine the communication boundaries (and, more generally, the network topology) from the client perspective (i.e., the perspective of electronic devices 312). This capability may facilitate improved management of a WLAN. For example, access point 310-1 may use the determined communication boundaries and the identified neighboring access points to recommend that electronic device 312-1 transition from access point 310-1 to access point 310-2. Because the communication boundaries reflect the perspective of electronic device 312-1 (e.g., the communication performance may be improved after transitioning to access point 310-2), a transition technique implemented in electronic device 312-1 may be more likely to accept the recommendation (i.e., because the recommendation is more likely to be effective in improving the communication performance). Similarly, access point 310-1 may use the communication boundaries to determine when to selectively respond to a probe request from one of electronic devices 312, such as electronic device 312-1. Consequently, the communication techniques may improve the communication performance in the WLAN, which may reduce user frustration when using electronic devices 312 and the associated WLAN and, thus, may provide an improved user experience.

While one or more of access points 310 perform the operations in the communication techniques in the preceding discussion, in some embodiments a computer (such as at least one of the one or more optional controllers 314) performs at least some of the operations in the communications techniques. For example, a controller in the one or more controllers 314 may receive probe-request information from access points 310 via network 316. Then, the controller may determine the communication boundaries, nearest neighbor access points, etc. This information may be stored in memory in the controller for subsequent use by access points 310 (e.g., as needed, a given access point may request the information) and/or the controller may distribute the determined network topology to access points 310 via network 316.

In the described embodiments, processing a frame or a packet in a given one of the one or more access points 310 or a given one of the one or more electronic devices 312 may include: receiving wireless signals 320 with the frame or packet; decoding/extracting the frame or packet from the received wireless signals 320 to acquire the frame or packet; and processing the frame or packet to determine information contained in the frame or packet.

Although we describe the network environment shown in FIG. 3 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 310, the one or more electronic devices 312 and/or the one or more optional controllers 314. As another example, in another embodiment, different electronic devices are transmitting and/or receiving frames or packets.

Figure 4:
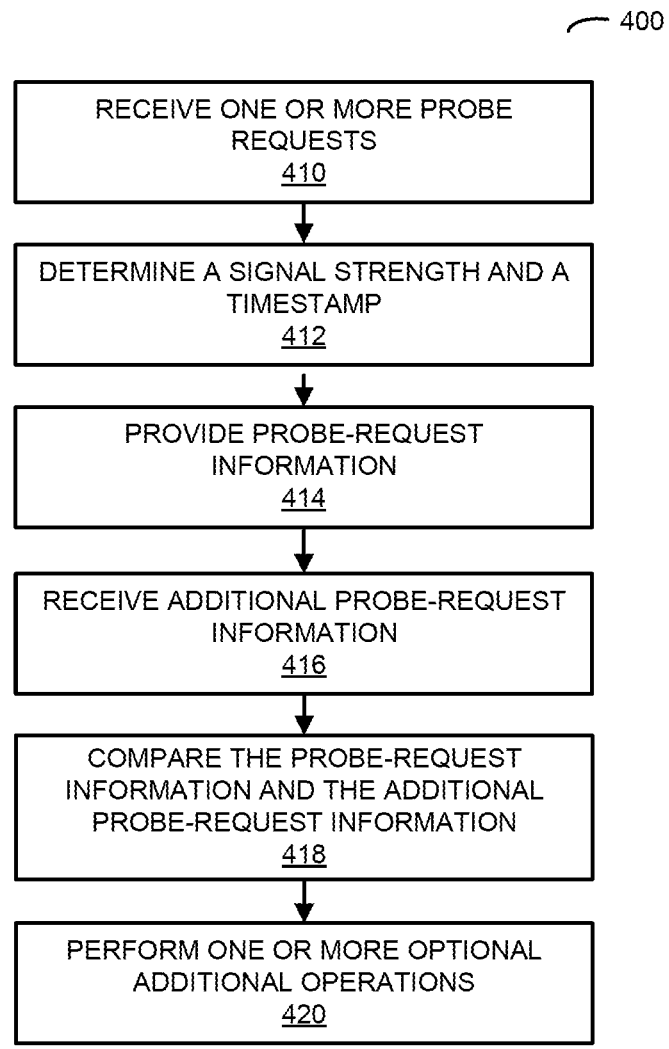
FIG. 4 is a flow diagram illustrating an example method for determining communication boundaries in the system in FIG. 3 in accordance with an embodiment of the present disclosure.

We now describe embodiments of the method. FIG. 4 presents an example of a flow diagram illustrating an example method 400 for determining communication boundaries. Moreover, method 400 may be performed by an access point, such as one of the one or more access points 310 in FIG. 1, e.g., access point 310-1.

During operation, the access point may receive one or more probe requests (operation 410) associated with one or more electronic devices. Note that a given probe request may include an identifier of a given electronic device. For example, the one or more probe requests may include wild-card probe requests (which may include a wildcard SSID) and/or the identifier may include a MAC address. Moreover, when the access point receives the given probe request (operation 410), the access point may determine a signal strength (operation 412) associated with the given probe request and a timestamp (operation 412) when the given probe request was received. In some embodiments, the signal strength may include an RSSI.

Then, the access point may provide, to one or more additional access points, probe-request information (operation 414) for the one or more probe requests, where the probe-request information from the access point includes identifiers, signal strengths and timestamps of the one or more probe requests received by the access point. Furthermore, the access point may receive, from the one or more additional access points, additional probe-request information (operation 416) for at least the one or more probe requests, where the additional probe-request information from the one or more additional access points includes additional identifiers, additional signal strengths and additional timestamps for at least the one or more probe requests received by the one or more additional access points.

Next, the access point may compare the probe-request information and the additional probe-request information (operation 418) to determine the communication boundaries. For example, the access point may compare the probe-request information and the additional probe-request information for pairs of access points to determine the communication boundaries. In some embodiments, RSSI values at different neighboring access points for probe requests that were transmitted at approximately the same time from the same electronic device may be compared. Based at least in part on the comparisons, locations or regions where the RSSI at a given access point is larger than neighboring access points may be determined. Then, the communication boundaries between the regions, where the RSSI value for a given access point transitions from being the largest to being smaller than the largest RSSI value, may be determined.

In some embodiments, the access point may perform one or more optional additional operations (operation 420). For example, the access point may optionally provide, to the one or more additional access points, the determined communication boundaries, and may receive, from the one or more additional access points, additional communication boundaries determined by the one or more additional access points.

Then, the access point may compute common communication boundaries in the WLAN based at least in part on the communication boundaries and the additional communication boundaries. Notably, the common communication boundaries may be an average of the communication boundaries and the additional communication boundaries. Alternatively, the common communication boundaries may be determined by removing one or more outliers (such as the communication boundary with the largest difference from the average communication boundaries) in the communication boundaries and the additional communication boundaries. (Alternatively or additionally, the communication boundary may be formed from an entire grouping of first and second RSSI strengths and a percentile threshold of those RSSI strengths across the access points. Thus, instead of determining the boundaries with each neighboring access point of an access point, an RSSI boundary may be formed by determining a distribution of the probe-request RSSIs.) Next, the access point may provide, to the one or more additional access points, the common communication boundaries.

Moreover, the access point may provide, to an electronic device in the one or more electronic devices, a recommendation for a transition in the WLAN based at least in part on the determined communication boundaries and a signal strength associated with the electronic device. For example, the recommendation may include a transition to a different channel or a different access point. In some embodiments, the recommendation is compatible with BSS transition management.

Furthermore, the access point may identify neighboring access points based at least in part on the probe-request information and the additional probe-request information.

In some embodiments of method 400, there may be additional or fewer operations. Moreover, there may be different operations. Furthermore, the order of the operations may be changed, and/or two or more operations may be combined into a single operation.

Figure 5:
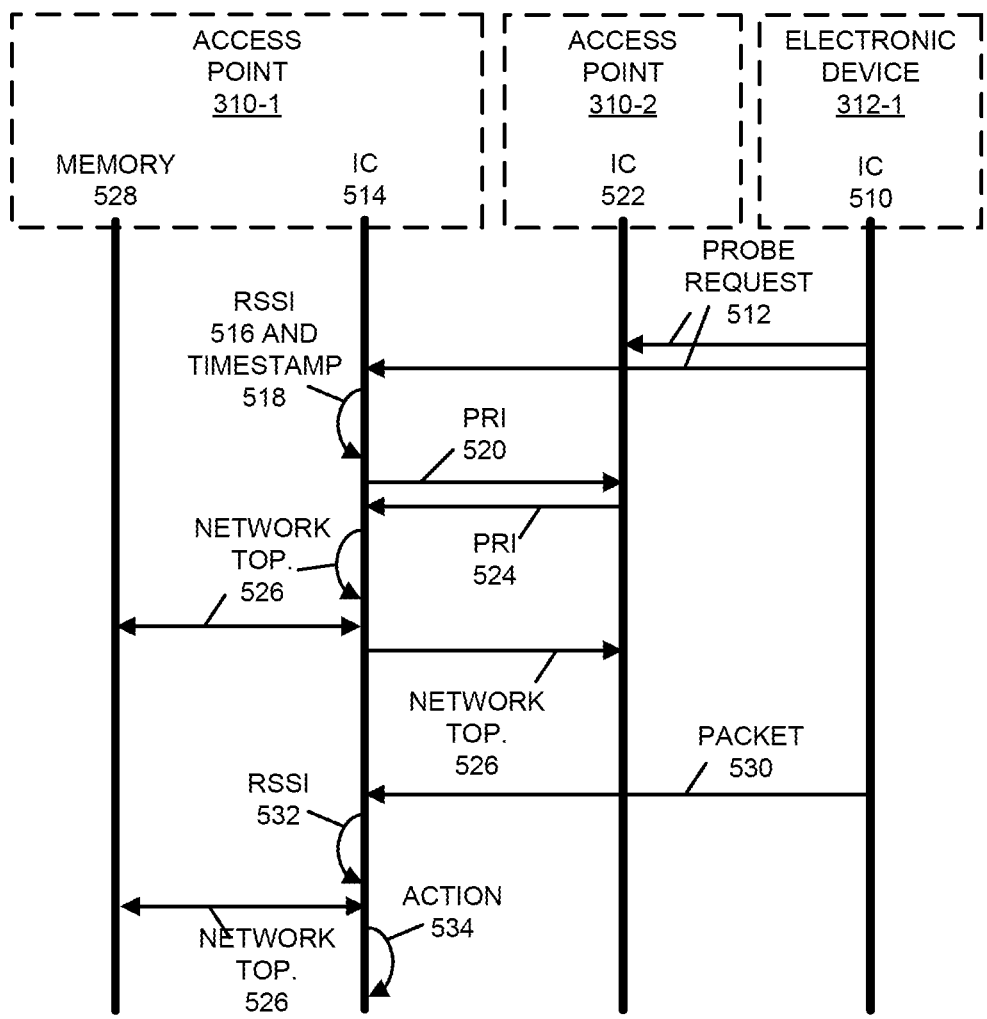
FIG. 5 is a drawing illustrating an example of communication among electronic devices in FIG. 3 in accordance with an embodiment of the present disclosure.

FIG. 5 presents a drawing illustrating an example of communication among access points 310 and electronic device 312-1. In FIG. 5, an interface circuit (IC) 510 in electronic device 312-1 may transmit or provide a probe request 512 to access points 310. This probe request may include a MAC address of electronic device 312-1.

Then, access points 310 may receive probe request 512. Using access point 310-1 as an illustration, an interface circuit 514 in access point 310-1 may receive probe request 512. Moreover, when interface circuit 514 receives probe request 512, interface circuit 514 may determine an RSSI 516 associated with probe request 512 and a timestamp 518 when probe request 512 was received.

Next, interface circuit 514 may provide, to access point 310-2, probe-request information (PRI) 520 about probe requests (such as probe request 512) received by access point 310-1, and interface circuit 522 in access point 310-2 may provide, to access point 310-1, probe-request information 524 about probe requests (such as probe request 512) received by access point 310-2. Note that access point 310-2 may receive probe request 512 on a different channel than access point 310-1.

Furthermore, interface circuit 514 may compare probe-request information 520 and 524 to determine network topology 526 (such as communication boundaries in a WLAN), and may store information that specifies network topology 526 (such as RSSI values along the communication boundaries) in memory 528 in access point 310-1. In some embodiments, interface circuit 514 optionally provides the determined network topology 526 to access point 310-2.

Subsequently, access point 310-1 may use the determined network topology 526 to manage the WLAN. For example, interface circuit 510 may transmit a packet 530 or frame to access point 310-1. After receiving packet 530, interface circuit 514 may determine an RSSI 532 associated with packet 530.

Based on RSSI 532 and network topology 526, interface circuit 514 may perform an action 534. For example, when packet 530 is a probe request, and RSSI 532 and network topology 526 indicate that communication performance with access point 310-2 is better than access point 310-1, interface circuit 310-1 may not provide a probe response to electronic device 312-1 (i.e., the probe response may be suppressed).

Alternatively, when electronic device 312-1 is associated with or connected to access point 310-1, and RSSI 532 and network topology 526 indicate that communication performance with access point 310-2 is better than access point 310-1, interface circuit 310-1 may provide a recommendation (such as a BTM recommendation) to electronic device 312-1 to transition from access point 310-1 to access point 310-2.

Note that components in access point 310-2 may perform additional instances of the operations performed by components in access point 310-1.

While FIG. 5 illustrates some operations using unilateral or bilateral communication (which are, respectively, represented by one-sided and two-sided arrows), in general a given operation in FIG. 5 may involve unilateral or bilateral communication.

Figure 6:
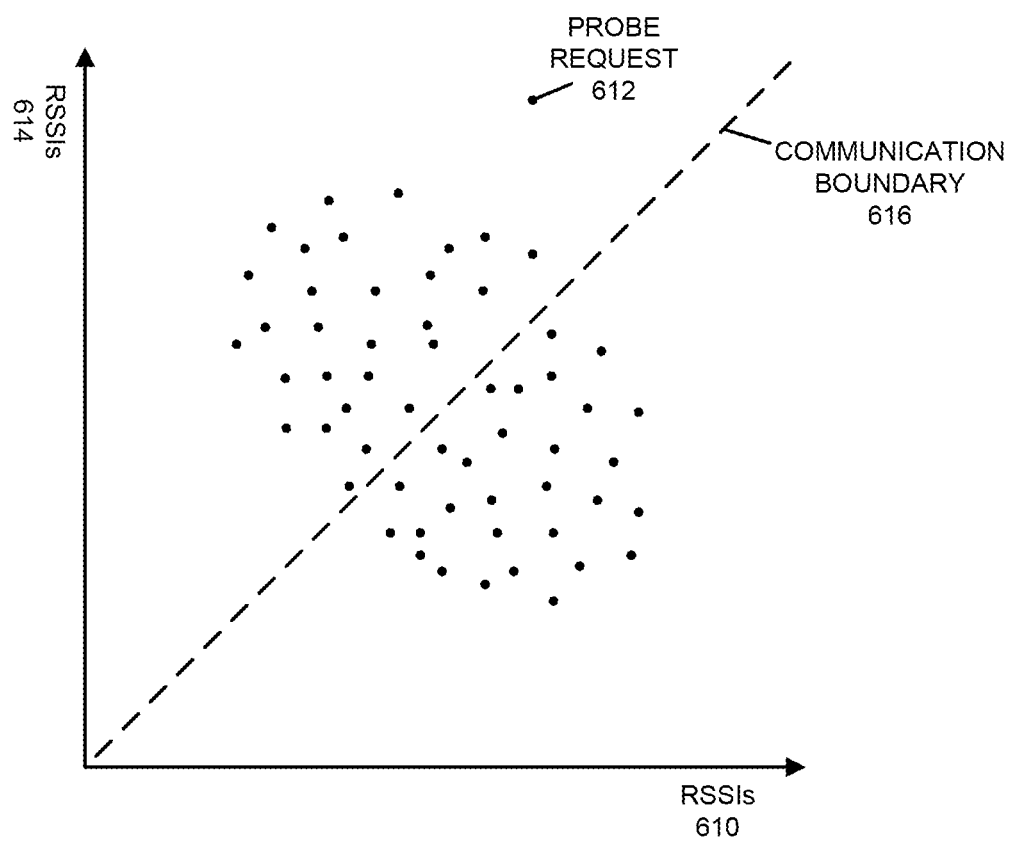
FIG. 6 is a drawing illustrating an example of a comparison of probe-request information received by different access points in accordance with an embodiment of the present disclosure.

FIG. 6 presents a drawing illustrating an example of a comparison of probe-request information received by different access points. In FIG. 6, each data point in the graph represents the RSSI values recorded at access point 310-1 and access point 310-2 for respective probe requests that are received at access points 310-1, 310-2 from a given electronic device that have timestamps that are within a preselected threshold. As shown in FIG. 6, data points that are above the communication boundary 616 correspond to electronic devices whose probe requests have higher RSSI values at access point 310-2 than at access point 310-1, while data points that are below the communication boundary 616 correspond to electronic devices whose probe requests have higher RSSI values at access point 310-1 than at access point 310-2. Thus, FIG. 6 graphically shows a comparison between RSSIs 610 for probe requests (such as probe request 612) received at access point 310-1 (FIG. 3) and RSSIs 614 for probe requests 612 received at access point 310-2 (FIG. 3) and how the comparison may be used to define a communication boundary 616, which corresponds to substantially equal RSSI values or strengths (such as RSSI values within 1, 5 or 10% of each other). Note that graphs such as the graph of FIG. 6 and associated communication boundaries 616 may be determined for multiple different pairs of access points (or may be determined for one access point and other neighbors jointly). Thus, using the identifiers (such as MAC addresses) and the timestamps associated with probe requests, the probe requests from the same electronic device that were received by multiple access points 310 may be identified, so that the relative signal strengths at access points 310 can be determined. Communication boundary 616 may allow subsequent communication in a WLAN to be managed, such as determining (based on RSSI) whether a communication performance with access point 310-1 is better or worse than a communication performance with access point 310-2.

Figure 1:
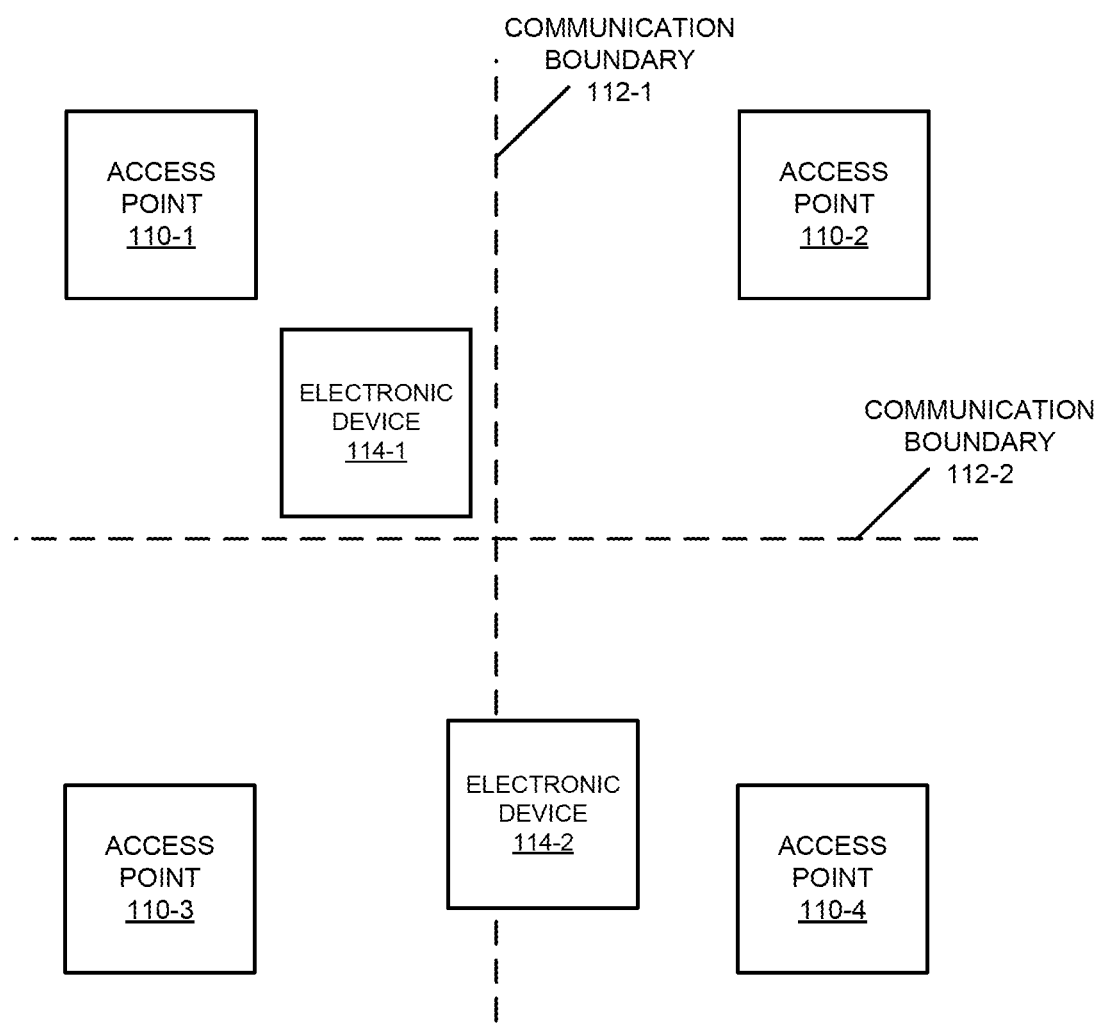
FIG. 1 is a drawing illustrating a top view of an example of an environment that includes access points and electronic devices.

In some embodiments, access point 310 may also share, with each other, information about responses to the probe requests received from electronic devices 312 (FIG. 1). Using this information, access points 310 and/or one or more optional controllers 314 can determine when access points 310 should respond to subsequent probe requests based at least in part on RSSI values of the subsequent probe requests. This may allow management traffic in a WLAN to be reduced.

Thus, using the communication techniques, one or more access points 310 and/or one or more optional controllers 314 (FIG. 3) may map out a network topology, including: communication boundaries, nearest neighbors, access points at an edge of a WLAN, etc. This network topology may be used to provide improved management in a WLAN.

In some embodiments, the communication techniques are used to reduce the amount of management traffic seen over the air in dense environments. For example, the communication techniques may be used to determine the thresholds above which an access point accepts management traffic and below which it rejects management traffic. However, if the threshold is too high, clients cannot connect and may be stranded. Alternatively, if the threshold is too low, access points may respond to all management traffic, and there would not be any benefit from management control. Consequently, it is desirable to get the communication boundaries and, by extension, the thresholds correct.

In the communication techniques, probe requests that are sent by clients may be used to help access points map out the actual ground-level network topology (e.g., which access points are neighbors, how close are the other access points, etc.) as perceived by clients. Notably, probe-request statistics may be gathered, shared among the access points, and processed to extract the network topology.

For example, each of the access points may gather information about probe requests from clients (e.g., probe requests during a scan) and may exchange this information with at least neighboring access points. Notably, when looking for WLANs or an access point with improved communication performance, clients often perform a network scan in which they transmit a series of probe requests on various channels in quick succession. Each access point may gather information about the MAC address of the client (or other identifying information), the time of receipt, and the signal strength. Then, the access point may exchange this information either with its neighbors and/or with a central data structure (such as a cloud-based controller) depending on whether the communication techniques are implemented in a distributed or centralized way. In some embodiments, a controller may determine the communication boundaries, which are then distributed to one or more access points.

In the discussion that follows, a centralized implementation is used as an illustration, however, in other embodiments the communication techniques are implemented on individual access points. Notably, the receipt timestamps and the client identifier may be used to cluster/group probe requests that were transmitted at very close to the same time from the same client. This clustering may allow a network topology discovery technique to generate scan samples that indicate how a signal from a client was received by multiple access points across multiple channels. In a dense WLAN deployment, there may be hundreds and thousands of such correlated probe requests or scan-samples over a period of minutes, hours, or days, which can be used for network topology discovery. (Alternatively or additionally, during installation an installer may intentionally walk through the corners of an environment to insure that network topology was mapped out and that there are no coverage holes.)

Next, neighboring access points may be determined or identified. Notably, access points that are neighbors as seen from the client perspective may be determined. For example, a joint probability may be compared with an independent probability. In some embodiments, a probability that a particular access point received a given probe request with a largest signal strength and that another access point received the given probe request with the second largest signal strength may be computed. This probability may be computed where each access point is independent from the other access points (e.g., the probability in which the two events do not influence or impact each other) and as a joint probability (in which the two events occur simultaneously). The probability is the likelihood that the given probe request at the access point has the largest signal strength divided by all other signal strength possible outcomes at the access point times the probability that the given probe request at the other access point has the second largest signal strength divided by all other signal strength possible outcomes at the other access point. Moreover, the joint probability is the probability that the given probe request at the access point has the largest signal strength given that the given probe request at the other access point has the second largest signal strength times the probability that the given probe request at the other access point has the second largest signal strength. If the joint probability is larger than the independent probabilities would predict, then the two access points may be neighbors in the network topology from the point of view of a client. Alternatively or additionally, the neighboring access points may be determined based at least in part on the absolute signal strengths. In this approach, pairs of access points that have the largest joint signal strength would be selected from the scan samples.

Moreover, transition thresholds (which are sometimes referred to as 'secondary thresholds' or 'secondary transition thresholds') for transition from a primary access point to a secondary (nearest neighbor) access point may be determined. Notably, the scan samples may be used to determine signal strength thresholds that indicate a client transition from the primary access point to the secondary access point. During secondary boundary or threshold discovery, scan samples that the primary access point shares with its secondary or neighboring access points may be used. In these scan samples, the primary access point had the largest or the second largest signal strength for a received probe request and one of the secondary access points had the largest or the second largest signal strength for the received probe request. For example, two distributions of scan samples may be used, wherein a first distribution may include scan samples in which one of the secondary access points had a larger signal strength than the primary access point, and a second distribution may include scan samples in which the primary access point had a larger signal strength than any of the secondary access points. In these embodiments, an upper bound for the secondary transition threshold may be based at least in part on an upper end of the first distribution. In an ideal WLAN, a maximum value of the first distribution may be used as the upper bound for the secondary threshold, because this is the largest signal strength at which a secondary access point is better than the primary access point. In practice, because data collection is often imperfect, a percentage of the maximum value may be used as the upper bound for the secondary transition threshold (such, e.g., as 90%).

Furthermore, a lower bound for the secondary transition threshold may be based at least in part on a lower end of the second distribution. Notably, in an ideal WLAN, a minimum value of distribution may be used as the lower bound for the secondary threshold, but in practice a percentage (such, e.g., 10%) may be used. This lower bound on the secondary threshold may indicate the smallest signal strength at which the primary access point has a larger received signal strength than any of the secondary access points.

Additionally, transition thresholds (which are sometimes referred to as 'tertiary thresholds' or 'tertiary transition thresholds') from the primary access point to tertiary access points may be determined. In this case, scan samples that are similar to those used to determine the secondary transition thresholds may be used to determine tertiary thresholds for the signal strength. Notably, instead of considering access points that are nearest neighbors, tertiary access points may be access points that are neighbors of the nearest neighbors of the primary access point, without being a secondary access point or the primary access point itself.

During tertiary boundary or threshold discovery, the scan samples that a primary access point shares with its secondary and tertiary neighbors may be used. Notably, the scan samples in which the received signal strength at the secondary access point is larger than any other access point may be used. Then, from these scan samples, a subset of scan samples where the primary access point had the second ranked signal strength and a tertiary access point had the third rank may be used. Alternatively, from the scan samples, a subset of scan samples where a tertiary access point had the second ranked received signal strength and the primary access point had the third ranked signal strength may be used. Once again, two distributions may be created. A third distribution may include the scan samples in which one of the tertiary access points had a larger received signal strength than the primary access point, and a fourth distribution may include the scan samples in which the primary access point had a larger received signal strength than any of the tertiary access points.

Moreover, an upper bound of the tertiary threshold may be based at least in part on an upper end of the third distribution. In an ideal WLAN, a maximum value of the third distribution may be used as the upper bound for the tertiary threshold, because this is the largest signal strength at which a tertiary access point is better than the primary access point if none of the secondary access points were present. In practice, because data collection is often imperfect, a percentage of the maximum value may be used as the upper bound for the tertiary transition threshold (such as, e.g., 90%).

Similarly, a lower bound for the tertiary transition threshold may be based at least in part on a lower end of the fourth distribution. Notably, in an ideal WLAN, a minimum value of distribution may be used as the lower bound for the tertiary threshold, but in practice a percentage (such, e.g., 10%) may be used. This lower bound on the tertiary threshold may indicate the smallest signal strength at which the primary access point has a larger received signal strength than any of the tertiary access points if none of the secondary access points were present.

Using one of the determined thresholds or a combination of the determined thresholds, a probe or $i^{th}$ management frame rejection threshold may be defined. For example, the lower bound of the tertiary threshold may define or specify a threshold below which the primary access point does not provide a probe response to a client.

Figure 2:
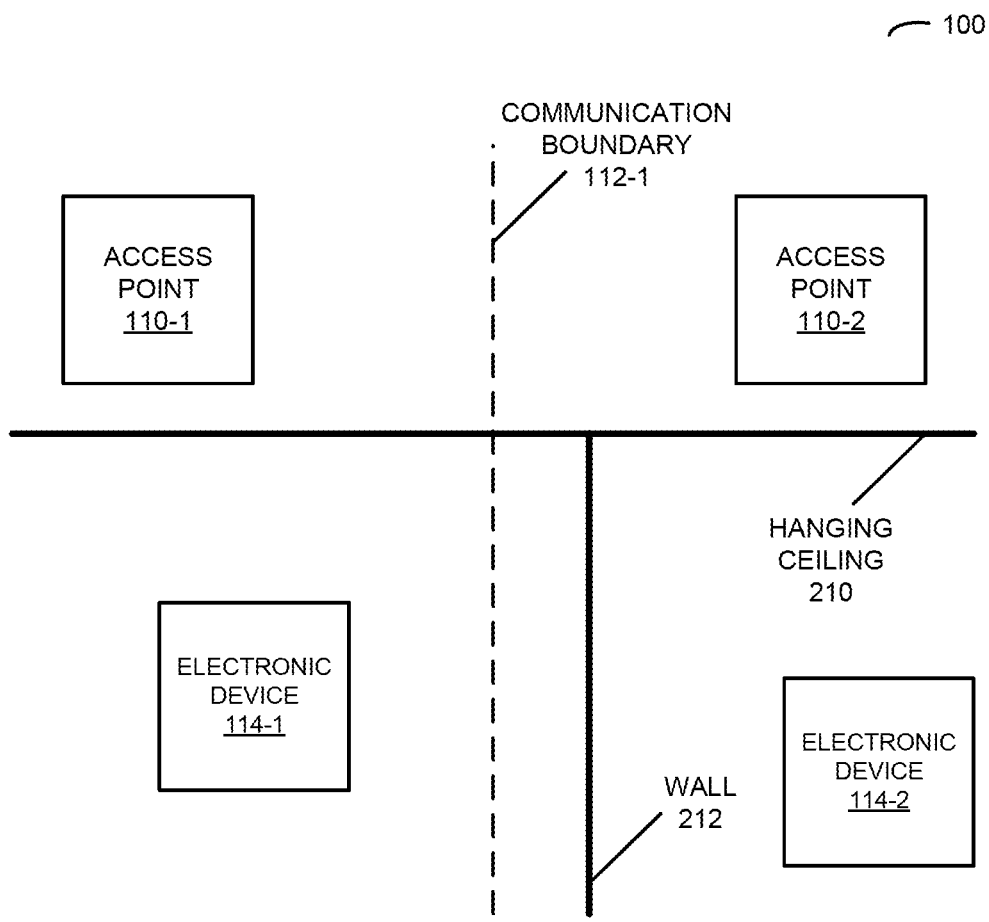
FIG. 2 is a drawing illustrating a side view of an example of the environment of FIG. 1.

Thus, the communication techniques may determine thresholds in a WLAN based at least in part on communication with clients, as opposed to existing approaches that only use access point-to-access point communication and/or access points listening to other access points. Because the existing approaches typically do not consider how the clients are heard by the access points, the existing approaches often miss barriers, walls, and/or client distributions that impact the network topology from the perspective of a client. For example, when access points are placed above a dropped or a hanging ceiling (as shown in FIG. 2), there may be very little pathloss during communication among these access points. However, the walls bounding conference rooms that extend to the hanging ceiling may significantly impact the pathloss between a client in a conference room or a hallway and the access points above the hanging ceiling. Consequently, the communication techniques may allow the network topology to be more accurately determined, which may result in improved communication performance in a WLAN and improved management of the WLAN.

In some embodiments of the communication techniques, comparisons of probe requests are performed to determine a network topology. For example, probe requests from a given client that are received by access points within a time interval (such as when timestamps of the probe requests are within 100 ms, 1 s, 5 s, 10 s, 30 s, 60 s, 60 min, 1 day, etc.) are compared.

As an example of the analysis of probe requests received by access points within a time interval, suppose there are three access points (left or L, center or C, and right or R) arranged along a line at, respectively, $x=-2$, $x=0$ and $x=+2$. Moreover, assume there are clients arranged in a uniform distribution along the line from $-5$ to $+5$ (a range of 10).

L will determine that the signal strengths of probe requests received within the time interval from clients between $-5 \leq x < -1$ (a range of 4) are largest, while C will determine that the signal strengths of probe requests received within the time interval from clients between $-1 \leq x \leq +1$ (a range of 2) are largest, and R will determine that the signal strengths of probe requests received within the time interval from clients between $+1 < x \leq +5$ (a range of 4) are largest. Table 1 summarizes the individual probabilities that access points (or a controller) determine a given client has the largest signal strength.

TABLE 1

|   | Probability of largest signal strength | Probability of second largest signal strength |
|---|---|---|
| L | 4/10 | 2/10 |
| C | 2/10 | 8/10 |
| R | 4/10 | 2/10 |

Similarly, C will determine that the signal strengths of probe requests received within the time interval from clients between $-5 \leq x < -1$ and $+1 < x \leq +5$ (a range of 8) are the second largest, while L or R will determine that the signal strengths of probe requests received within the time interval from clients between $-1 \leq x \leq +1$ will are the second largest. Table 1 summarizes the individual probabilities that access points determine a given client has the second largest signal strength.

Note that in this example, L and C are neighbors and C and R are neighbors. R and L are not neighbors. Consequently, the joint probability for L and C as neighbors (i.e., that a given client is the largest signal strength at L and that the given client is the second largest signal strength at C, or that that the given client is the largest signal strength at C and that the given client is the second largest signal strength at L) is 50%, the joint probability for R and C as neighbors is 50%, and the joint probability that R and L are neighbors is 0%. Nonetheless, as described below, mathematically we can determine an independent probability that, e.g., the given client has the largest signal strength at L that the given client has the second largest signal strength at R.

Per Table 1, the independent probability I that the given client has the largest signal strength at L and that the given client has the second largest signal strength at C, or that the given client has the largest signal strength at C and that the given client has the second largest signal strength at L is 4/10·8/10+2/10·2/10=36/100. Similarly, the independent probability II that the given client has the largest signal strength at R and that the given client has the second largest signal strength at C, or that the given client has the largest signal strength at C and that the given client has the second largest signal strength at R is 4/10·8/10+2/10·2/10=36/100. Moreover, the independent probability III that the given client has the largest signal strength at R and that the given client has the second largest signal strength at L, or that the given client has the largest signal strength at L and that the given client has the second largest signal strength at R is 2/10·4/10+2/10·4/10=16/100.

The sum of independent probabilities I, II and III is 34/100+34/100+16/100=88/100. Therefore, the normalized independent probabilities I, II and III are, respectively, 36/88 or 40.9%, 36/88 or 40.9% and 16/88 or 18.18%.

Comparing the joint probabilities with the independent probabilities, L and C are neighbors because 50% is greater than 40.9%. Similarly, R and C are neighbors because 50% is greater than 40.9%. However, L and R are not neighbors because 0% is less than 18.18%. This confirms the disclosed logical criterion in the communication techniques in the present patent application.

We now describe embodiments of an electronic device, which may perform at least some of the operations in the communication techniques. For example, the electronic device may include a component in system 300, such as one of: the one or more access points 310, the one or more electronic devices 312 and/or the one or more optional controllers 314. FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, graphical processor units (GPUs) and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory (which collectively or individually are sometimes referred to as a 'computer-readable storage medium'). In some embodiments, instructions for processing subsystem 710 in memory subsystem 712 include: one or more program modules or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720.) For example, networking subsystem 714 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 700 may be adapted or changed using pattern shapers (such as reflectors) in one or more antennas 720 (or antenna elements), which can be independently and selectively electrically coupled to ground to steer the transmit antenna radiation pattern in different directions. Thus, if one or more antennas 720 includes N antenna-radiation-pattern shapers, the one or more antennas 720 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting frames and/or scanning for frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   an antenna; and
   an interface circuit, coupled to the antenna, configured to wirelessly communicate with one or more electronic devices and to wired or wirelessly communicate with at least an additional access point, wherein the access point is configured to:
   receive one or more probe requests associated with the one or more electronic devices, wherein a given probe request comprises an identifier of a given electronic device;
   measure, for each of the one or more probe requests, signal-strength information associated with the given probe request and timestamp information that specifies when the given probe request was received;
   provide, addressed to at least the additional access point, probe-request information for the one or more probe requests, wherein the probe-request information from the access point comprises the identifiers of the one or more electronic devices from the one or more probe requests, the signal-strength information and the timestamp information of the one or more probe requests received by the access point;
   receive additional probe-request information for at least the one or more probe requests, which is associated with at least the additional access point, wherein the additional probe-request information from at least the additional access point comprises additional identifiers, additional signal-strength information and additional timestamp information for the one or more probe requests received by at least the additional access point; and
   compare the probe-request information and the additional probe-request information to determine communication boundaries between regions in which communication performance is superior for different access points.

2. The access point of claim 1, wherein at least one of the identifiers comprises a media access control (MAC) address.

3. The access point of claim 1, wherein at least one of the signal-strength-information comprises a received signal strength (RSSI).

4. The access point of claim 1, wherein the one or more probe requests comprise wild-card probe requests.

5. The access point of claim 1, wherein the communication boundaries are determined based at least in part on comparison of the probe-request information and the additional probe-request information for pairs of access points.

6. The access point of claim 1, wherein the access point is configured to:
   provide, addressed to at least the additional access point, the determined communication boundaries;
   receive additional communication boundaries, which are associated with at least the additional access point;
   compute common communication boundaries in the WLAN based at least in part on the communication boundaries and the additional communication boundaries; and
   provide, addressed to at least the additional access point, the common communication boundaries.

7. The access point of claim 1, wherein the access point is configured to provide, to an electronic device in the one or more electronic devices, a recommendation for a transition based at least in part on the determined communication boundaries and the signal-strength information associated with the electronic device.

8. The access point of claim 7, wherein the recommendation comprises a transition to a different channel or a different access point.

9. The access point of claim 7, wherein the recommendation is compatible with basic service set (BSS) transition management.

10. The access point of claim 1, wherein the access point is configured to identify one or more neighboring access points based at least in part on the probe-request information and the additional probe-request information.

11. The access point of claim 1, wherein the access point is configured to compare the probe-request information and the additional probe-request information to determine neighboring access points.

12. A non-transitory computer-readable storage medium for use in conjunction with an access point, the computer-readable storage medium storing program instructions, wherein, when executed by the access point, the program instructions cause the access point to perform one or more operations comprising:
   receiving one or more probe requests associated with one or more electronic devices, wherein a given probe request comprises an identifier of a given electronic device;
   measuring, for each of the one or more probe requests, signal-strength information associated with the given probe request and timestamp information that specifies when the given probe request was received;
   providing, addressed to at least an additional access point, probe-request information for the one or more probe requests, wherein the probe-request information from the access point comprises the identifiers of the one or more electronic devices from the one or more probe requests, the signal-strength information and the timestamp information of the one or more probe requests received by the access point;
   receiving additional probe-request information for at least the one or more probe requests, which is associated with at least the additional access point, wherein the additional probe-request information from at least the additional access point comprises additional identifiers, additional signal-strength information and additional timestamp information for the one or more probe requests received by at least the additional access point; and comparing the probe-request information and the additional probe-request information to determine communication boundaries between regions in which communication performance is superior for different access points.

13. The non-transitory computer-readable storage medium of claim 12, wherein at least one of the signal-strength information comprises a received signal strength (RSSI).

14. The non-transitory computer-readable storage medium of claim 12, wherein the one or more probe requests comprise wild-card probe requests.

15. The non-transitory computer-readable storage medium of claim 12, wherein the communication boundaries are determined based at least in part on comparison of the probe-request information and the additional probe-request information for pairs of access points.

16. The non-transitory computer-readable storage medium of claim 12, wherein the operations comprise:
    providing, addressed to at least the additional access point, the determined communication boundaries;
    receiving additional communication boundaries, which are associated with at least the additional access point;
    computing common communication boundaries in the WLAN based at least in part on the communication boundaries and the additional communication boundaries; and
    providing, addressed to at least the additional access point, the common communication boundaries.

17. The non-transitory computer-readable storage medium of claim 12, wherein the operations comprise providing, to an electronic device in the one or more electronic devices, a recommendation for a transition based at least in part on the determined communication boundaries and the signal-strength information associated with the electronic device.

18. The non-transitory computer-readable storage medium of claim 17, wherein the recommendation comprises a transition to a different channel or a different access point.

19. The non-transitory computer-readable storage medium of claim 12, wherein the operations comprise identifying neighboring access points based at least in part on the probe-request information and the additional probe-request information.

20. A method for determining communication boundaries, comprising:
    by an access point:
    receiving one or more probe requests associated with one or more electronic devices, wherein a given probe request comprises an identifier of a given electronic device;
    measuring, for each of the one or more probe requests, signal-strength information associated with the given probe request and timestamp information that specifies when the given probe request was received;
    providing, addressed to at least an additional access point, probe-request information for the one or more probe requests, wherein the probe-request information from the access point comprises the identifiers of the one or more electronic devices from the one or more probe requests, the signal-strength information and the timestamp information of the one or more probe requests received by the access point;
    receiving additional probe-request information for at least the one or more probe requests, which is associated with at least the additional access point, wherein the additional probe-request information from at least the additional access point comprises additional identifiers, additional signal-strength information and additional timestamp information for the one or more probe requests received by at least the additional access point; and
    comparing the probe-request information and the additional probe-request information to determine communication boundaries between regions in which communication performance is superior for different access points.

* * * * *